Oct. 10, 1967     J. E. STILLA ET AL     3,345,723
DUMMY PIN MEANS AND METHOD FOR
ASSEMBLING NEEDLE BEARINGS
Filed July 28, 1965

INVENTORS
JOHN E. STILLA
BY WILLIAM H. GREENWALD

ATTORNEYS

United States Patent Office 3,345,723
Patented Oct. 10, 1967

3,345,723
DUMMY PIN MEANS AND METHOD FOR ASSEMBLING NEEDLE BEARINGS
John E. Stilla, North Royalton, and William H. Greenwald, Strongsville, Ohio, assignors to Stellar Industrial Products Co., Cleveland, Ohio, a partnership
Filed July 28, 1965, Ser. No. 475,456
15 Claims. (Cl. 29—148.4)

The present invention relates generally to a device and method for assembling bearings, and more particularly to an improved type of dummy pin and method of utilizing same for the process or operations of assembling needle bearings into cylindrical bores or openings in gears or other objects and retaining the bearings in proper location until relative insertion of a shaft or other like object.

In the prior art of assembling needle or other roller bearings into the bores of gears or in other locations where the bore itself is to provide the outer-race of the bearing arrangement with a sleeve or shaft inserted within the bearings as the inner-race surface, to keep the rollers or needle rolls within the bore in proper position until insertion of the shaft such diverse expedients have been used as thick grease coatings on the rolls whereby the rolls are held in position adhering to each other and to the inside of the bore; or by use of the so-called "dummy pins," plug-like elements having a diameter approximating the diameter of the shaft or element intended to be received within and contacted by the bearings.

Where viscous materials such as grease or the like are used to cause adherence between the parts retaining the rollers in position, obviously there is entailed the expense and time consumption for removal of grease or other material so used. On the other hand, where for avoidance of the aforesaid disadvantages dummy pins have been used as roller retaining filler elements, to achieve the desired result it has been necessary to provide pins machined to a very close tolerance specific to the particular job or device to be assembled, in order that the fit should be tight enough for self-retention of the plug and of the bearings until subsequent assembly of a shaft in the plug location. This has required close machining and tolerances of plugs used in mass production operations, for example, for gears, of nominally identical bores. Further the plugs used for a part or gear of one nominal bore then cannot be used for parts or gears of another run having a slightly different nominal bore size.

In part to overcome these disadvantages a plug has been provided as in the Reichardt U.S. Patent 2,860,406 including resilient projecting elements at locations spaced axially and slightly offset in angular sense which tend to "keystone" or wedge between adjacent rolls in an assembly thereby as well skewing the roll complement relative to the intended gear or part axis in a manner assuring a frictional engagement and retention; and which further eliminates need for close tolerance machining of the cylindrical body of such type dummy pin. The structure proposed in that patent, although overcoming certain of the aforesaid disadvantages, does on the other hand have other disadvantages in complexity of structure, number of parts and cost of fabrication.

By the present invention there is provided a simple form of dummy pin generally simpler in construction and of lower cost which achieves the "keystoning" function of the aforesaid patent as well as other desirable functions. The device of this invention has the further decided advantage that it may be used not only for the assembly of needle or roller bearings having a single roll set, but also for bearing arrangements involving double sets of rolls with an axially interposed spacer sleeve or collar, and which further can be so arranged to cooperate with the spacer that it is impossible to assemble a part without inclusion of the spacer. Also a dummy pin of the present invention is adapted to a construction whereby, should the bearing rolls be even one short of the proper number, the device will not retain the rolls, with the result that the assembly immediately comes apart on leaving the loading machine. These latter features are of considerable importance in modern mass production methods of parts of the character here involved, since it is impossible to make an apparent assembly in which the necessary spacer ring of full roll complement is lacking, thereby avoiding necessity of any type of inspection for these aspects.

The general object of the present invention is then to provide an improved device and method for assembling of needle or roller bearings of the character described, overcoming one or more of the disadvantages of the prior art.

Another object is to provide an effective dummy pin of simple construction.

A further object is to provide a dummy pin of which the operation eliminates need of inspection to insure presence of certain parts in the assembly on leaving a bearing loading machine.

Other objects and advantages will appear from the following descriptions and the drawings wherein.

Figure 1:
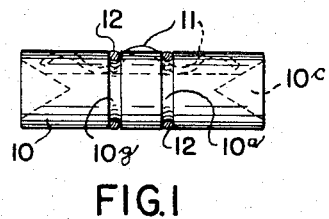
FIG. 1 is a side elevational view of one form of dummy pin device embodying the present invention.

A roller bearing retainer device, as one embodiment of the instant invention, is shown in the drawings as comprised of a cylindrical body or pin 10, having a relatively narrow and deep longitudinal slot 10s accommodating an undulant or wavy spring 11, further described later with respect to FIG. 2, which is retained in the slot by a pair of split spring metal rings 12 received in respective circumferential grooves 10g formed in spaced relation in the body as here shown at equal distances from the mid-point of mid-length of the body. However, it is to be understood that the spring, and hence its retaining rings and the grooves for the latter, need not be centered along the length of the pin or body, as particular parts to be assembled may dictate otherwise.

At opposite ends, the body is here provided with like centering cone recesses 10c coaxial with the body axis which may serve as centers in various manipulations of the pin or elements assembled thereon, and further by intersecting the longitudinal slot, the conical recesses can assure end clearance or end freedom of the spring 11 if desired. The grooves 10g are of suitable form and depth to receive completely the split rings 12 being here shown of a depth equal to the circular cross section of the spring wire forming the rings and having a semi-circular round bottom so that the split rings 12 are flush or in any event not projecting beyond the cylindrical surface of the pin body. The grooves 10g may have a width somewhat greater than the diameter of the wire stock of rings 12 to insure against binding.

The spring 11 is shown as formed of spring wire of wavy or undulant form and might be said to be two and one half wave lengths long, providing in terms of position in the slot, three crests disposed upwardly towards the top of the slot, a center crest and like end crests, and two troughs bearing on the bottom of the slot. The spring crests are shaped relative to the axial spacing of the grooves 10g and the slot depth so that in the assembled relation of FIG. 1 the rings 12 hold the spring captive against escape radially or axially from the groove by embracing the center crest on either side about half way up from the trough bottom.

The spring 11 is a flat spring, that is, coplanar in the sense that its curved center line lies in a plane. Viewed in side elevation as in FIG. 2, the spring is symmetrical about a vertical plane perpendicular thereto at the center of the top of the middle crest. A line tangent to the top of the center crest is spaced upwardly a short distance from a parallel line tangent to the top of the end crests when the spring is in a free condition while the axial ends of the spring are spaced slightly upwardly like distances from a line tangent to the bottom of the troughs.

The rings 12 are circular in form with a slight gap at the split, which is substantially smaller than the diameter of the wire used for spring 11.

As shown in FIG. 1, however, when the spring is held in place by the rings 12 the center crest projects above the slot or beyond the cylindrical surface of the body, while the two end crests have tops located practically flush or slightly below, in preferred relation, the top of the slot or cylindrical surface.

Figure 7:
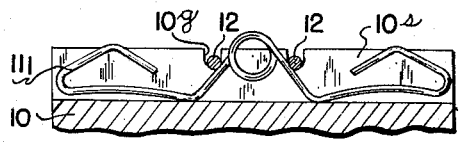
FIG. 7 shows a dummy pin incorporating the spring of FIG. 6.
Figure 2:
FIG. 2 is a detailed elevational view of an undulant form spring used in the device of FIG. 1.
Figure 8:
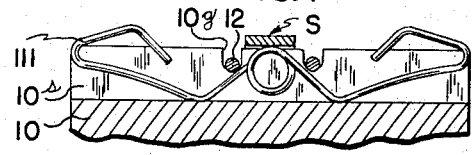
FIG. 8 shows the pin of FIG. 7 with a spacer ring thereon as in FIG. 3.
Figure 6:
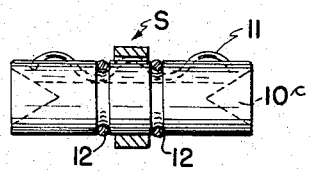
FIG. 6 shows a second form of spring.

A second embodiment of the invention is disclosed in FIGS. 6, 7 and 8 differing in the form of the spring 111 as is apparent by comparison of FIG. 6 with FIG. 2; all other elements being essentially the same as the like numbered components in FIGS. 1–5, except for the greater width of the longitudinal slot 10s relative to the stock of spring 111 to accommodate the shape of the latter.

The spring 111 is generally symmetrical about its center except for the offset of its two arms because of the presence of a complete circular central loop, serving the function of the center crest in the spring 11 of FIG. 1, at which the double wire stock thickness requires a slot width twice that (plus clearances) in FIG. 1.

Here as in the first form, the diameter of the spring wire stock is preferably less than the diameter of the rollers to be assembled in order to obtain a "self-inspection" feature on the proper number of rolls. Then with even a one roll shortage, the backwardly reflected spring ends, serving as the crests in the FIG. 1 spring form and hence called "crests," pass freely between adjacent rolls without developing holding forces in the assembly.

With the pin device entirely outside an assembly and no spacer ring present, the central crest or loop protrudes markedly outwardly from the slot 10s, with the angularly disposed arm parts bearing against and retained by rings 12; the rounded knees, through which the arms are reflected slightly upwardly to arch outwardly, bearing on the bottom of the slot at locations axially outwardly from the location of the grooves 10g. At the descending end of its arch each arm is bent up and back about 180° into a short sloping straight portion to a bend point inwardly of which a short straight terminal portion slopes back toward the arch, the bend point or crest being flush or slightly projecting from the slot.

When a spacer ring is in place (see FIG. 8) the center crest or loop again is depressed inwardly into the slot, the slot for this reason having a depth at least as great as the diameter of the loop and preferably somewhat deeper for clearance and ease in assembly of the device. The angle included between the tangent straight portions changes from less than to greater than a right angle. The arms are accordingly kicked outwardly of the slot each pivoting about its respective knee on the slot bottom, again to develop wedging forces in a roll assembly. At all times however the terminal end of each arm is within the slot, as well as most of the semi-circular extreme end bend, to guide the end crest in and out of the slot with stability.

Figure 9:
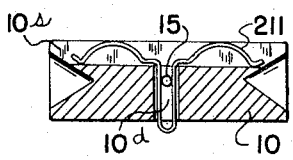
FIG. 9 shows a still further modification of the invention with a spacer ring in position as in FIG. 3.

In FIG. 9, a quite different spring 211 appears, having the two end crests, located in the longitudinal slot as previously, joined by a tang portion extending through a diametric bore or slot 10d perpendicular to and with axis coplanar with the slot centerplane. A pin 15 between the parallel wire reaches forming the tang keeps the tang in the bore, though permitting the tang to slide from the position shown with crests retracted and tang projecting from the opposite side of the pin, to a crest projecting position when the spacer collar is positioned between the crests.

Figure 3:
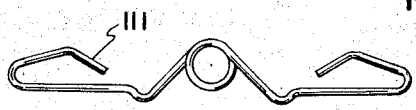
FIG. 3 is a side elevational view corresponding to FIG. 1 showing a cooperating bearing spacing ring in position on the outside a part assembly to illustrate the effect of the presence of the ring.
Figure 4:
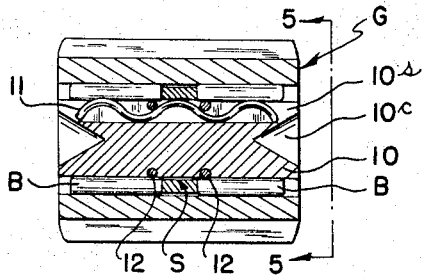
FIG. 4 is an axial sectional view through a gear having two sets of needle or roller bearings with interposed spacer assembled therein and secured in position by the device of the present invention, the section being taken as indicated by the line 4—4 in FIG. 5.

When the device is going to be used, for example, to aid the assembly of two sets of roller bearings into the cylindrical bore of a gear G as shown in FIG. 4, where the two circumferential sets of rollers or needle bearings BB have an interposed axial spacer sleeve or collar S, as shown in FIG. 3, the spacer is slipped endwise onto the pin body and brought to a center location where in passing over the center crest and depressing it into the slot, it causes the end crests to kick upwardly out of the slot, while itself being held frictionally by the upward thrust exerted on its internal circumference by the center crest. However, in appropriate apparatus, the spacer as well as the needles or rolls may be machine-loaded into the assembly on the pin.

The resulting assembly is then brought into the bore of the gear G, with the several needle rollers comprising the two like sets of bearings BB being brought into position in any suitable manner hitherto used, by hand loading, or in the environment for which the device of this invention is particularly useful and primarily intended, by machine loading and assembly.

In any event, however the assembly is achieved, not only is the spacer S retained in the center position by the pressure or friction of the center crest, but each set of bearings is retained in consequence of the keystoning effect of the two end crests, which being urged outwardly each tend to wedge upwardly between two adjacent rollers or needles of a respective set thereby developing in each bearing set force components between each needle or roller and its neighbors and the pin and the internal cylindrical surface of the gear bore. The applied forces thus develop frictional forces at the area of contact quite sufficient to maintain the dummy pin device, the spacer ring S and the bearings of the sets B in assembled position as shown in FIGS. 4 and 5.

These frictional forces suffice for subsequent normal handling of the gear with assembled bearings and spacers until that point in operations is reached at which the device is axially displaced in known and normal procedures by an axially entering or inserted shaft element of the like then provided with appropriate end retainer rings.

Figure 5:
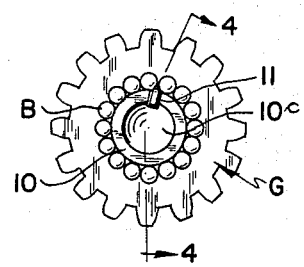
FIG. 5 is an end view of the assembly of FIG. 4.

A particular advantage of this device arises where it is used for an assembly such as that shown in FIGS. 4 and 5, requiring two bearing sets and an interposed spacer ring S. In modern mass production machine operations, the dummy pin or device and the bearings are brought into the center of the part in assembled relation by automatic magazine fed machinery, and even the initial assembly of the collar or sleeve S with the dummy pin into the arrangement of FIG. 3 may be carried out by machine methods. Under these conditions, it is quite possible that the assembly of dummy pin, bearings and gear may take place with the spacer sleeve S omitted, resulting in a completely unacceptable partial assembly. If such a faulty assembly should proceed to further operations, for example, to an attempted insertion of a shaft element, the economic loss resulting is apparent. Costly inspection procedures may be the least required, and upon an inspection failure far greater loss will result as use of the faulty part proceeds into larger assemblies.

However, if the sleeve is not in position, the center crest remains projecting and the end crests retracted relative to the slot as in FIG. 1 which then results in an inability of the dummy pin to produce a self-holding assembly with the bearing sets in the part. Upon any movement of the faulty part assembly from a bearing filling or loading station by ordinary procedure and handling, the bearings will spill out so that the faulty part is immediately self evident, and in some types of loading even at the loading station the failure to develop the holding force or keystoning effect will immediately become apparent.

It may be here noted further that instances where a single set of longer bearings is to be used in a part having a bore and receiving bearings for which a given pin length and diameter is suitable, the pin may also be used in a similar manner, inasmuch as the center crest then achieves a keystoning effect on the bearings quite similar to that described as achieved in each set by the projecting resiliently outwardly biased end crests.

Because of the keystone effect achieved by the outward wedging action of a crest of a spring between a pair of adjacent rollers, the dimensioning and machining of the external surface of the pin is far less critical, can have a wider tolerance, than in prior pins in which a close frictional fit was relied upon, as well as accommodating further from part to part the tolerances in the internal bore diameter as well as tolerances or variations among the bearing rollers themselves. This advantage accrues to an extent not only where the dummy pin is sized for a particular part of one nominal inside bore diameter for rollers of a given nominal size, but also the pin may be used for assemblies where the nominal bore or nominal bearing sizes may be different quite apart from the question of tolerances.

It will be noted that this bearing retainer means or dummy pin construction has decided advantages over that disclosed in the known prior art. A solid pin may be used for the body stock, the spring is readily formed to desired shape and retained by the simple expedient of the split rings in contrast to the use of a hollow plug body and a required resilient plug or other means inserted therein to retain the keystoning or bearing retaining spring means. Also the slot is readily formed in contrast with the requirement for forming distinct short radial apertures in the manner described in said patent. Skewing as such is not required. Further there is no possibility of deterioration of the means securing the spring leading to its complete loss in operations with possible damage to equipment. Conceivably under some unusual circumstances of slight probability one retaining ring 12 might break, but the wavy spring would still be effectively retained by the other.

We claim:

1. A dummy pin device for retaining a set of roller bearings or the like within a cylindrical bore of a part during handling of the part subsequent to, and to aid, assembly of said bearings into the bore, comprising:
   A cylindrical pin body having a longitudinal slot,
   means providing a resilient spring arm disposed in said slot with a roller wedging crest portion on said arm adapted to project from said slot into wedging engagement between a pair of adjacent said rollers,
   and means for maintaining said arm in said slot with a portion of said crest projecting from the slot for bearing roller wedging purposes.

2. A dummy pin device as described in claim 1, wherein the first said means provides a pair of said arms with the crest portions in axially spaced relation in said slot.

3. A dummy pin device for retaining two sets of roller bearings or the like axially spaced by a spacer ring within a cylindrical bore of a part during handling of the part subsequent to, and to aid, assembly of said bearings and sleeve into the bore, comprising a cylindrical pin body having a longitudinal slot; means providing resilient spring arms disposed in said slot, said arms having respective roller wedging crest portions in axially spaced relation in said slot adapted to project from said slot into wedging engagement between a pair of adjacent said rollers in a respective roller set; said means comprising a resilient formed spring wire element shaped to have two end crests providing said crest portions and a central portion integrally connecting said end crests, said spring element shaped for said crest portions to be withdrawn inward in said slot to a non-roller-wedging disposition while said central portion is projecting beyond the cylindrical surface of said pin body, and for said crest portions to be projecting from said slot in a roller wedging disposition when said central portion is pressed inwardly substantially to the confines of said cylindrical surface, whereby a bearing spacer ring assembled onto said device between said end crests actuates said element for roller retaining purposes and absent said ring the device is ineffective for retaining said roller sets; and means for maintaining said spring element in said slot with said central portion normally projecting from said slot.

4. A dummy pin device as described in claim 3, wherein said body is provided with a diametric passage perpendicular to said slot, said central portion is bent into an elongated U-shaped tang slideably displaceable and guided in said passage and projectable from the pin body on the side opposite said slot.

5. A dummy pin as described in claim 4, wherein the second said means is provided by a retaining pin passing transversely through said passage between the legs of the U-shaped tang.

6. A dummy pin device as described in claim 3, wherein said spring element is undulantly shaped to provide said central portion in the form of a central crest with two trough portions each located between the central crest and a respective end crest, said trough portions bearing on the bottom of said slot with said central crest normally projecting out of said slot and with said crest portions withdrawn into non-roller-wedging disposition; said crest portions projectable into roller-wedging disposition upon depression of the central crest into said slot.

7. A dummy pin as described in claim 6, with the second said means comprising at least one split spring ring located in a circumferentially extending groove of the pin body between said central crest and an end crest.

8. A dummy pin as described in claim 6, having two said spring rings each in a respective said groove on axially opposite sides of said central crest.

9. A dummy pin device as described in claim 3, wherein said spring element is shaped to have a central portion comprising at least a complete circular loop in said slot with arm portions each carried out of the loop downward to a respective knee portion bearing on the bottom of said slot to arch away from and back toward the slot bottom terminating in an end portion spaced from the slot bottom and reflected back above the arched portion in a said crest portion; said loop normally projecting out of the slot as a central crest and spaced from the slot bottom with said crest portions withdrawn into non-roller-wedging disposition; said crest portions projectable into roller-wedging disposition upon depression of said central crest inward in said slot.

10. A dummy pin as described in claim 9, with the second said means comprising at least one split spring ring located in a circumferentially extending groove of the pin body between said central crest and an end crest portion.

11. A dummy pin as described in claim 10, having two said spring rings each in a respective said groove on axially opposite sides of said central crest.

12. A dummy pin device as described in claim 3, wherein the wire of which said spring wire element is formed has a diameter less than the diameter of the rollers of said roller bearing sets.

13. A method of assembling a set of roller bearing rollers into a cylindrical bore of a part as a sub-assembly which will be brought into an assembled relation with a shaft-like element supported by said rollers in said bore, comprising the steps of providing a dummy pin with cylindrical body, a longitudinal body slot, and a resilient arm secured in the slot having a crest portion biased outwardly from said slot, said crest portion having a transverse dimension less than the diameter of a said roller; surrounding said pin body with a set of said rollers in an ordered circumferential series and inserting said pin with the ordered roller set into said bore; transporting the part as a sub-assembly with said pin and set to a point of further assembly; and then displacing said pin axially from the sub-assembly and inserting said shaft-like element into said bearing set retained in order in said part bore.

14. A method of assembling two axially spaced sets of roller bearing rollers with an axially interposed spacer sleeve into a cylindrical bore of a part as a sub-assembly which will be brought into an assembled relation with a shaft-like element supported by said rollers in said bore, comprising the steps of providing a dummy pin with cylindrical body, a longitudinal body slot, and a resilient element secured in the slot having a pair of axially spaced crest portions movable outwardly from and into said slot and a central portion normally projecting beyond the cylindrical surface of said body, said crest portions movable outwardly into roller-wedging relation upon depression of the projecting central portion toward the pin body; placing a said spacer sleeve onto the pin body to depress the central portion; surrounding said pin body on each side of said spacer sleeve with a respective set of said rollers in an ordered circumferential series and inserting said pin with the sleeve, and ordered roller sets into said bore; transporting the part as a sub-assembly with said pin, sleeve and sets to a point of further assembly; and then displacing said pin axially from the sub-assembly and inserting said shaft-like element into said bearing sets retained in order in said part bore.

15. A method as described in claim 14, wherein said element is a spring element formed of wire having a diameter less than the diameter of the rollers of said roller bearing sets.

References Cited

UNITED STATES PATENTS 2,860,406  11/1958  Reichardt _____ 29—201

JOHN F. CAMPBELL, *Primary Examiner.*

THOMAS H. EAGER, *Examiner.*